United States Patent
Shin et al.

(10) Patent No.: US 8,260,965 B2
(45) Date of Patent: Sep. 4, 2012

(54) METHOD AND SYSTEM FOR PROVIDING BLOG SERVICE BY USING MOBILE TERMINAL, AND MOBILE BLOG CASTER THEREFOR

(75) Inventors: Seung-woo Shin, Yongin-si (KR); Sang-hyun Shin, Suwon-si (KR); Yong-Jun Lim, Seoul (KR); Byeong-seob Ko, Suwon-si (KR); Hyuk Namkoong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 70 days.

(21) Appl. No.: 12/259,408

(22) Filed: Oct. 28, 2008

(65) Prior Publication Data

US 2009/0198763 A1 Aug. 6, 2009

(30) Foreign Application Priority Data

Jan. 31, 2008 (KR) ........................ 10-2008-0010317

(51) Int. Cl.
*G06F 15/16* (2006.01)
(52) U.S. Cl. ........ 709/247; 709/203; 709/206; 709/218; 455/552.1; 455/556.2; 455/414.2
(58) Field of Classification Search .................... 709/247
See application file for complete search history.

(56) References Cited

U.S. PATENT DOCUMENTS

| | | | |
|---|---|---|---|
| 7,035,468 B2 * | 4/2006 | Yogeshwar et al. | 382/232 |
| 7,554,576 B2 * | 6/2009 | Erol et al. | 348/211.3 |
| 2002/0175917 A1 * | 11/2002 | Chakravarty et al. | 345/473 |
| 2006/0019699 A1 * | 1/2006 | Chang et al. | 455/552.1 |
| 2007/0094231 A1 | 4/2007 | Kim | |
| 2008/0261572 A1 * | 10/2008 | Tsui et al. | 455/414.2 |

FOREIGN PATENT DOCUMENTS

| | | |
|---|---|---|
| KR | 10-2000-0037244 | 7/2000 |
| KR | 10-2004-0107604 | 12/2004 |
| KR | 10-2005-0078082 A | 8/2005 |

OTHER PUBLICATIONS

Korean Office Action dated May 18, 2012, from Korean Patent Application 10-2008-0010317.

* cited by examiner

*Primary Examiner* — Michael Y Won
*Assistant Examiner* — Hua Fan
(74) *Attorney, Agent, or Firm* — Staas & Halsey LLP

(57) ABSTRACT

A method and system to provide a blog by using a mobile terminal, and a mobile blog (MB) caster therefor, the method including: receiving blog data including one or more pieces of downsized data from an MB caster; selecting a piece of downsized data from among the one or more pieces of downsized data; obtaining metadata corresponding to the selected piece of downsized data; accessing a web blog server; and downloading original data corresponding to the metadata from the web blog server. Since the blog is created and provided by using the downsized data, instead of the original data, a blog server operation can be realized by using only existing mobile devices. Furthermore, the mobile terminal does not have to be connected to the Internet (or the web blog server) for a blog service. Also, it is possible to provide the blog at very high speed.

17 Claims, 6 Drawing Sheets

FIG. 6
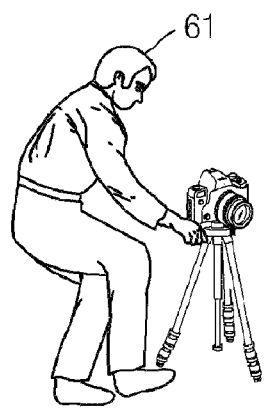
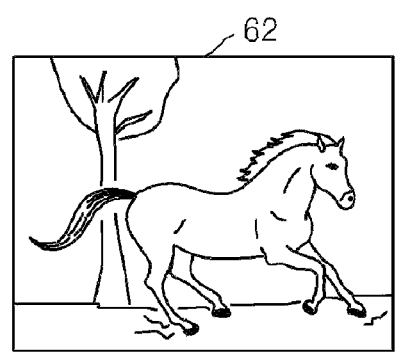
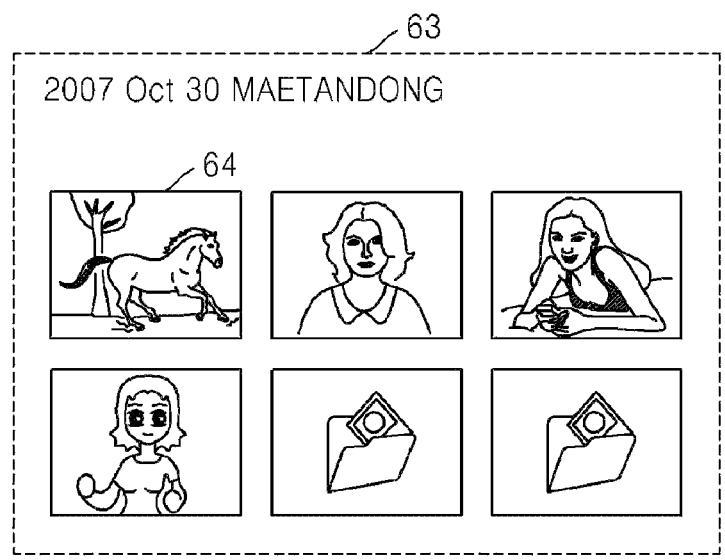

METHOD AND SYSTEM FOR PROVIDING BLOG SERVICE BY USING MOBILE TERMINAL, AND MOBILE BLOG CASTER THEREFOR

CROSS-REFERENCE TO RELATED APPLICATION

This application claims the benefit of Korean Patent Application No. 2008-10317, filed Jan. 31, 2008, in the Korean Intellectual Property Office, the disclosure of which is incorporated herein by reference.

BACKGROUND OF THE INVENTION

1. Field of the Invention

Aspects of the present invention relate to a method and system to provide a blog service, and more particularly, to a method and system to create and provide a blog by using a mobile terminal.

2. Description of the Related Art

These days, blogging has become wide-spread due to the continued development and evolution of the Internet. "Blog" is a term generated by assembling the words "web" and log," and is a common type of personal media. Blogging, which involves users creating their own media free from any intervention or restriction, has been widely popular for those who wish to journalize or interchange their thoughts with friends or acquaintances, to increase name-recognition as an expert in a specific field, and/or to obtain information about companies or products.

In general, a blog service is provided by a commercial blog service provider that has a large storage capacity web-server. A user uses such a blog service through a personal computer (PC). Recently, due to the development of wireless communication technologies and personal mobile terminals, technology to provide a mobile blog is being researched and developed. The mobile blog is a blog service using a mobile terminal. In the mobile blog, each mobile device operates as a blog server and/or a blog client, instead of the conventional large storage capacity web-server.

However, such a mobile blog has various limitations due to its technical features, as compared to the conventional blog service using a wired network. For example, a still image captured by the mobile device has a data rate of 1 to 5 megabits per second (Mbps), while common mobile devices have a storage space of less than 1 gigabyte. Thus, there is a limitation to the amount of blog data that can be stored by each of the mobile devices. Also, a wireless personal area network (PAN), used for the mobile blog, can only support a transmission rate of a maximum of 100 Mbps. Thus, a real-time blog service is difficult to realize in the case where images greater than a few megabytes are used without alteration. In addition, since common mobile devices have a display area of 2 to 7 square inches, an image having a high resolution (e.g., a High-Definition) is unnecessary.

SUMMARY OF THE INVENTION

Aspects of the present invention provide a method and system to efficiently provide a mobile blog service, and a mobile blog (MB) caster to create and to edit a blog.

According to an aspect of the present invention, there is provided an MB caster, including: a data downsizer to downsize original data; a metadata generation unit to generate metadata corresponding to the original data; a blog editor to create and/or to edit a blog by using the data downsized by the data downsizer; and a network interface to upload the original data to a web blog server.

According to another aspect of the present invention, there is provided a system to provide a blog by using a mobile terminal, the system including: an MB caster to create blog data and corresponding metadata; a mobile terminal to receive the blog data and the metadata from the MB caster; and a web blog server storing original data of the blog data, wherein the mobile terminal downloads the original data corresponding to the metadata from the web blog server by using the metadata.

According to another aspect of the present invention, there is provided a method of creating and editing a blog by using an MB caster, the method including: generating metadata corresponding to original data; creating and editing blog data from data obtained by downsizing the original data; and uploading the original data to a web blog server.

According to yet another aspect of the present invention, there is provided a method of providing a blog by using a mobile terminal, the method including: receiving blog data including one or more pieces of downsized data from an MB caster; selecting a piece of downsized data from among the one or more pieces of downsized data; and obtaining metadata corresponding to the selected piece of downsized data.

According to still another aspect of the present invention, there is provided a method of providing a blog by using a mobile terminal, the method including: receiving blog data and metadata from an MB caster; selecting downsized data in the blog data; and storing metadata corresponding to the selected downsized data.

According to another aspect of the present invention, there is provided an MB caster to provide blog data, the MB caster including: a data downsizer to downsize original data; a metadata generation unit to generate metadata corresponding to the original data; and a blog editor to create and/or to edit a blog by using the data downsized by the data downsizer.

According to another aspect of the present invention, there is provided a method of creating and editing a blog by using an MB caster, the method including: generating metadata corresponding to original data; and creating and editing blog data from data obtained by downsizing the original data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings of which:

FIG. 6 is a diagram illustrating examples of original data and blog data generated by a method of creating and editing the blog, according to an embodiment of the present invention.

DETAILED DESCRIPTION OF THE EMBODIMENTS

Figure 1:
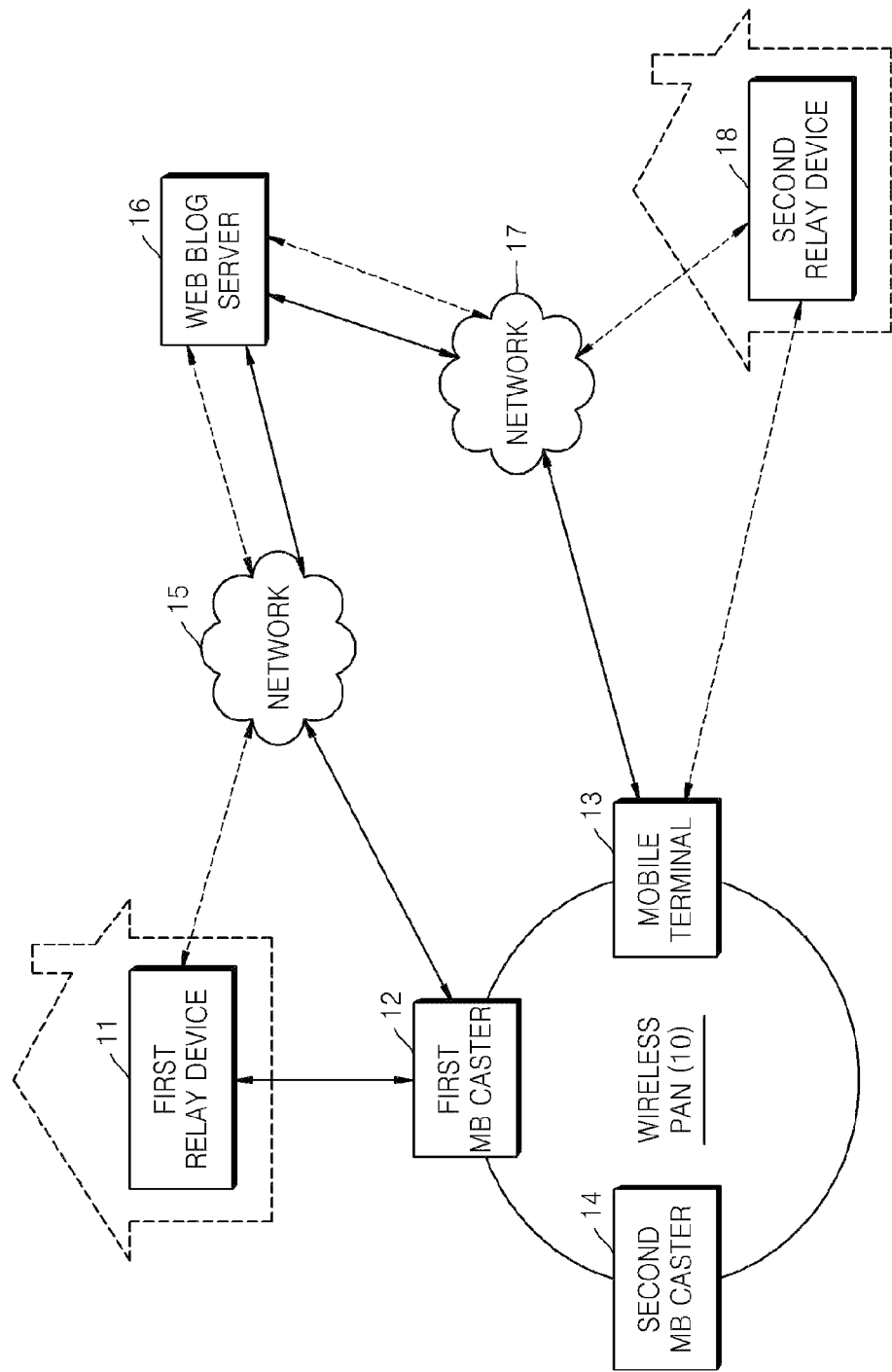
FIG. 1 is a diagram illustrating a configuration of a system to provide a blog by using a mobile terminal according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a configuration of a system to provide a blog by using a mobile terminal according to an embodiment of the present invention. Referring to FIG. 1, the system to provide the blog includes a wireless personal area network (PAN) 10, a web blog server 16, first and second relay devices 11 and 18, and networks 15 and 17 that connect the aforementioned components by using an electric signal.

The wireless PAN 10 includes first and second mobile blog (MB) casters 12 and 14, and at least one mobile terminal 13. Furthermore, the wireless PAN 10 may select one of Wireless Broadband (WiBro), wireless universal serial bus (USB), Bluetooth, Ultra-wideband (UWB), Zigbee, etc., as a communication protocol.

The first and second MB casters 12 and 14 and the mobile terminal 13 are mobile devices having a wireless communication operation, and are used to provide blog data. Examples of the MB casters 12 and 14, and the mobile terminal 13 are mobile phones, personal digital assistants (PDAs), portable multimedia players (PMPs), etc. The MB casters 12 and 14 may create and edit a blog, and may operate as a blog server with respect to other mobile devices 13.

When an MB caster 12 or 14 operates as the blog server, other mobile devices 13 forming a PAN operate as clients with respect to the MB caster 12 or 14. For example, when the first MB caster 12 operates as the blog server, the second MB caster 14 and the mobile terminal 13 operate as the clients with respect to the first MB caster 12. The second MB caster 14 may also operate as the blog server, and in this case, the first MB caster 12 and the mobile terminal 13 operate as the clients.

The web blog server 16 is a server that has a large capacity storage space, and provides the MB casters 12 and 14 with a space to store original data, and the like.

The relay devices 11 and 18 are devices such as a personal computer (PC) that help the MB casters 12 and 14 upload the original data that is created by the MB casters 12 and 14, to the web blog server 16. The relay devices 11 and 18 may have a data transmission rate much greater than that of the MB casters 12 and 14.

Figure 2:
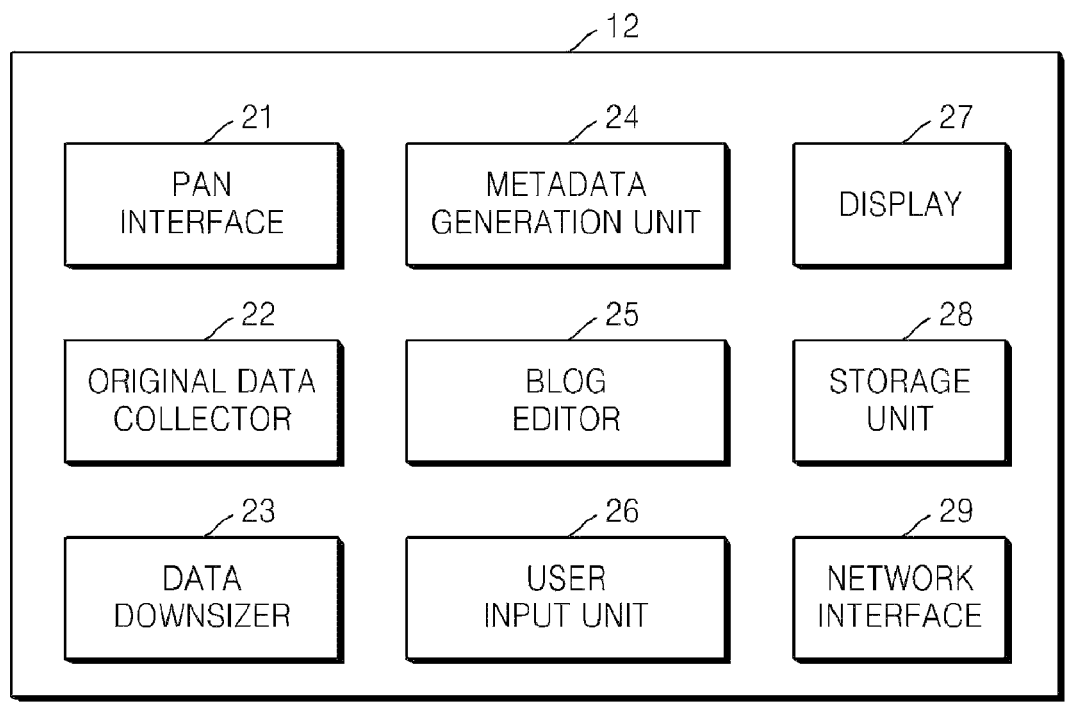
FIG. 2 is a block diagram illustrating a hardware structure of mobile blog (MB) casters according to an embodiment of the present invention.

FIG. 2 is a block diagram illustrating a hardware structure of the MB casters 12 and 14 according to an embodiment of the present invention. Each of the MB casters 12 and 14 includes a PAN interface 21, an original data collector 22, a data downsizer 23, a metadata generation unit 24, a blog editor 25, a user input unit 26, a display unit 27, a storage unit 28, and a network interface 29.

The PAN interface 21 enables the MB casters 12 and 14 to perform data communication for exchanging blog data and metadata with other mobile devices 13 forming the wireless PAN 10. The PAN interface 21 may select WiBro, wireless USB, etc. as a communication protocol.

The original data collector 22 collects a user's daily life information that is used to create a blog (i.e., the blog data). That is, the original data collector 22 acquires raw data (such as image data, audio data, etc.), and may include an image capture unit, a recording unit, a sensor unit, etc.

The image capture unit captures a still image and/or a moving picture. The recording unit records a voice and/or music. The sensor unit may include one or more sensors (such as a Global Positioning System (GPS), an acceleration measurement sensor, a pulse measurement sensor, a temperature sensor, etc.). The GPS collects position information via a satellite. The acceleration measurement sensor, the pulse measurement sensor, and the temperature sensor are respectively measure a moving distance and/or speed of a mobile device, a user's pulse, and a user's body temperature, which may be used for a life-logging of a user.

The data downsizer 23 downsizes a data amount of original data that is collected by the original data collector 22 or that is stored in the storage unit 28. In the case where the original data is image data, the data downsizer 23 may reduce a resolution of the image data or may compress (e.g., Moving Picture Experts Group (MPEG)) the image data. In the case where the original data is an audio signal, the data downsizer 23 may downsize the data amount by using an audio compression method.

The metadata generation unit 24 generates metadata about the original data. The metadata also has a correspondence relationship with data that has been downsized by the data downsizer 23. Thus, the metadata connects the original data and the downsized data.

The blog editor 25 is a component used to create and edit the blog (or the blog data) by using all or a part of the downsized data, according to a control signal received via the user input unit 26. According to aspects of the present invention, a user may create or edit the blog in the MB casters 12 and 14 by using the blog editor 25, without accessing the web blog server 16.

The storage unit 28 stores the original data collected by the original data collector 22, the downsized data created by the data downsizer 23, the blog data created by the blog editor 25, the metadata generated by the metadata generation unit 24, etc. Also, the storage unit 28 may store original data (e.g., text and audio/video (AV) data) obtained from another external device via the PAN interface 21 or the network interface 29. The storage unit 28 may include a blog program used to provide the blog data.

A user may input text necessary to form the blog (or a blog page), or input a control command to create and/or edit the blog, via the user input unit 26. The display unit 27 visually shows the blog page created and/or edited by the blog editor 25, and may include a liquid crystal display (LCD), etc. The network interface 29 processes a data communication between the MB casters 12 and 14 and the web blog server 16, or between the MB casters 12 and 14, and the relay devices 11 and 18. For example, the network interface 29 may select a peer-to-peer (P2P) protocol or the World Wide Web (WWW) as a transmission protocol.

Figure 3:
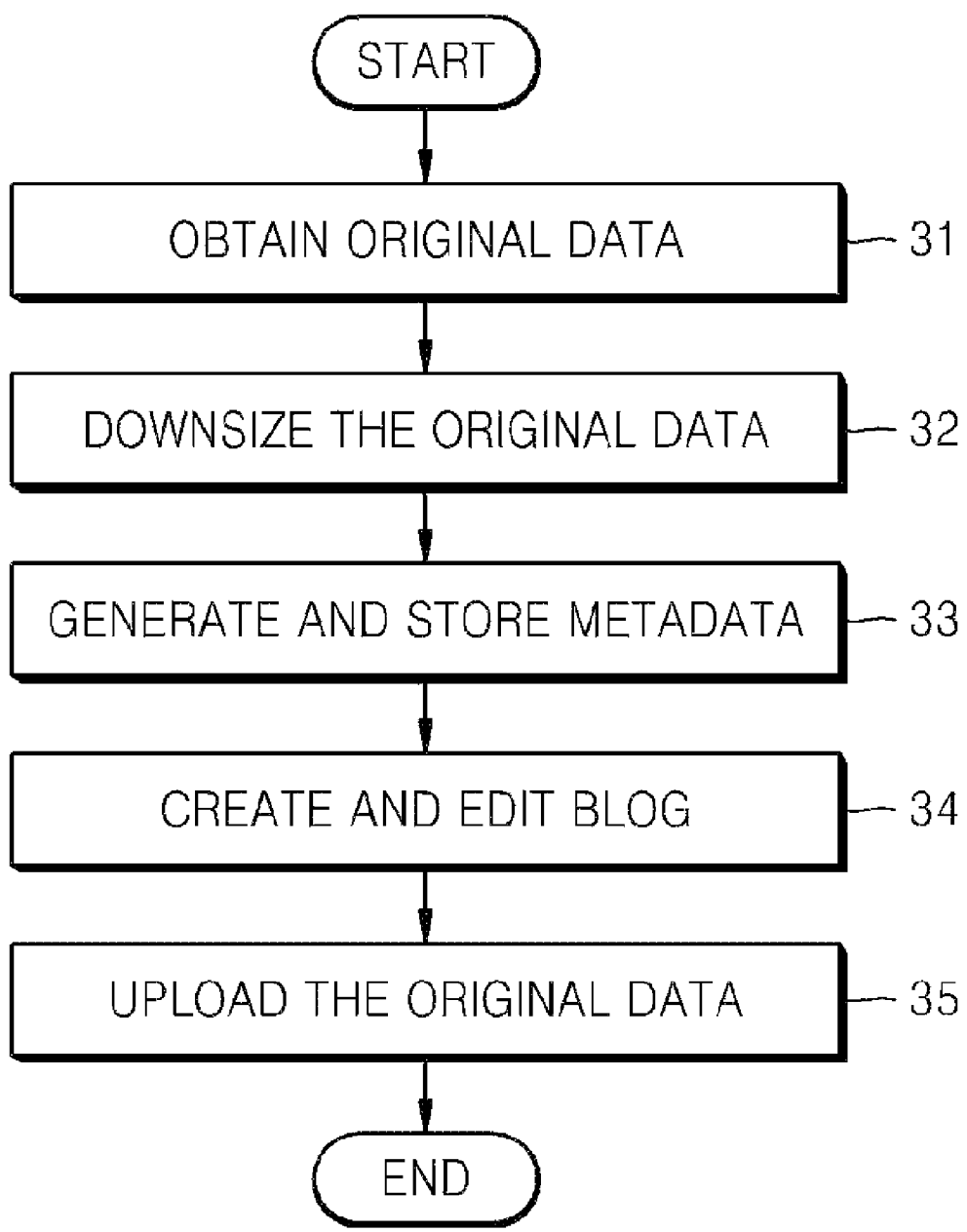
FIG. 3 is a flowchart of a method of creating and editing a blog by using MB casters, according to an embodiment of the present invention.

FIG. 3 is a flowchart of a method of creating and editing a blog by using the MB casters 12 and 14, according to an embodiment of the present invention. Referring to FIG. 3, original data is obtained to create or edit the blog in operation 31. Examples of the original data include various type of image data, audio data, text, etc., that may be obtained by using the original data collector 22 and/or from the storage unit 28.

The obtained original data is downsized in operation 32. That is, the data downsizer 23 may reduce a resolution of the image data that is the original data, or may reduce a data amount by compressing the image data and the audio data.

Metadata about the original data is generated and stored in operation 33. The metadata generation unit 24 generates the metadata by using the original data. Examples of the metadata are a storage location (e.g., a Uniform Resource Locator (URL)) of the original data, a data size, an identification, a production time, a production place, a producer, a data summary, etc.

Blog data is created and stored in operation 34. Here, the blog data includes page format information, downsized data, and the original data that is used to form a blog page. Specifically, a user may manipulate the blog editor 25 via the user input unit 26, thereby enabling a creation of the blog page or editing of an existing blog page. The blog editor 25 may obtain the original data and/or the downsized data, which is used to form the blog page, from the storage unit 28. However, in the case of text data, the user may directly input the text data via the user input unit 26.

According to an aspect of the present invention, the method of creating and editing the blog may use the downsized data rather than the original data. By using the downsized data, a total amount of the blog data may be reduced. Thus, a transmission load may be reduced when the blog data is transmitted to other mobile devices. However, the original data may be used without downsizing, for example, in a case where a size of the original data is small.

The original data is uploaded in operation 35. The MB casters 12 and 14 upload original data, which may correspond to downsized data forming the blog, to the web blog server 16 via the network interface 29. The MB casters 12 and 14 may directly access (denoted as a solid line in FIG. 1) the web blog server 16 to upload the original data. However, the MB casters 12 and 14 may also upload the original data via the relay devices 11 and 18 (e.g., the PC), which may have a transmission rate highly greater than that of mobile devices. That is, the original data is transmitted from the MB casters 12 and 14 to the relay devices 11 and 18 (for example, via a USB or the like), and then the original data is retransmitted (denoted as a dotted line in FIG. 1) from the relay devices 11 and 18 to the web blog server 16 via a transmission line (such as Asymmetric Digital Subscriber Line (ADSL)/Very High Speed Digital Subscriber Line (VDSL)).

FIG. 6 is a diagram illustrating examples of original data and blog data that are generated by the method of creating and editing a blog, according to an embodiment of the present invention. Referring to FIG. 6, a resolution of a still image 62 collected by an original data collector 61 (e.g., an image capture device) is reduced by the data downsizer 23 so that a data amount is downsized. The blog editor 25 creates a blog page 63 using downsized data. Blog data 64 in the blog page 63 corresponds to the downsized data.

It is understood that the order of operations 32 through 35 of FIG. 3 is not limited to the order illustrated in FIG. 3 but may differ, as long as the order may achieve the objectives and the effects of the present invention.

Figure 4:
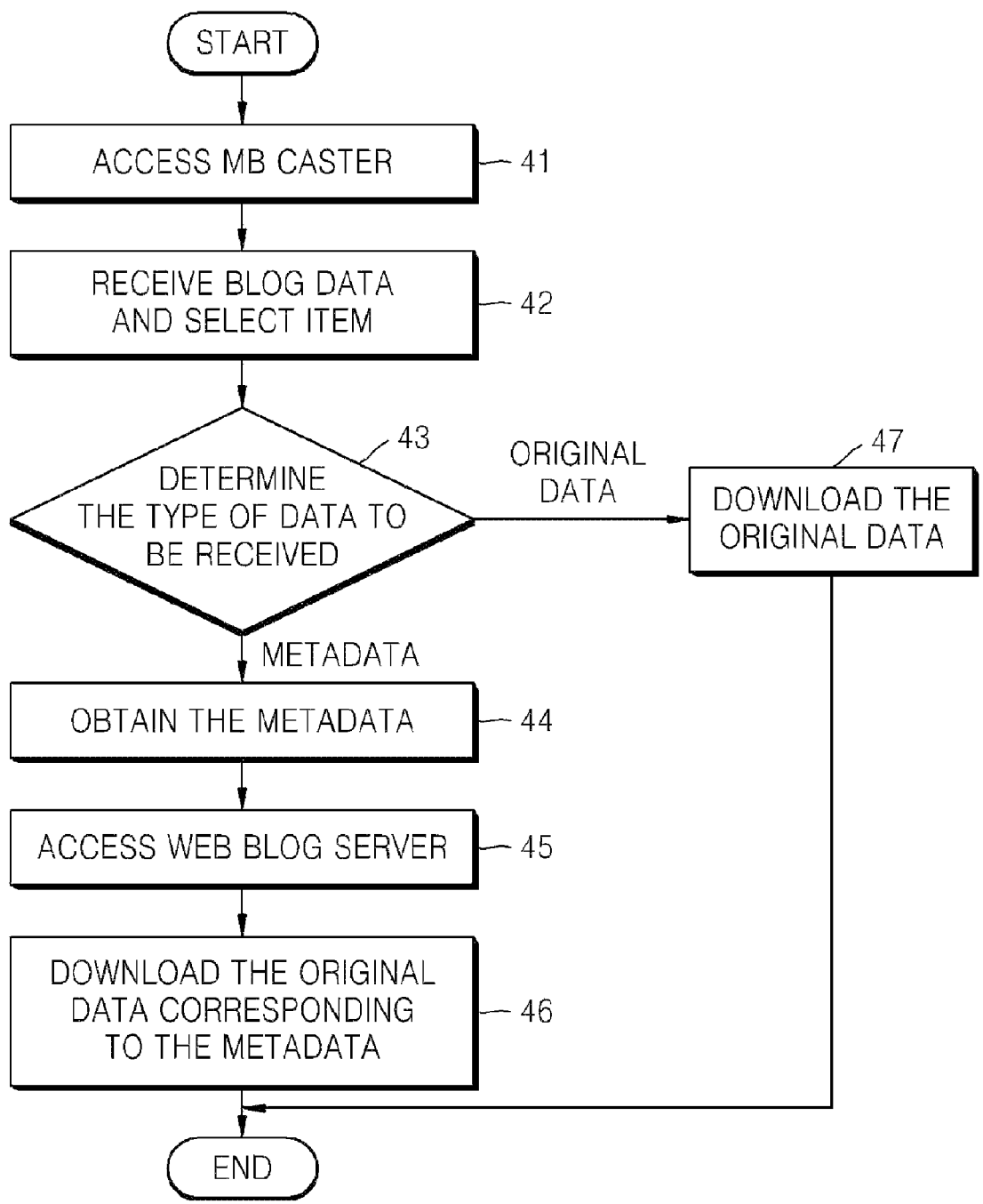
FIG. 4 is a flowchart of a method of providing a blog by using a mobile terminal, according to another embodiment of the present invention.

FIG. 4 is a flowchart of a method of providing a blog by using the mobile terminal 13, according to another embodiment of the present invention. Referring to FIG. 4, the mobile terminal 13 (or, the second MB caster 14) accesses the first MB caster 12 via the wireless PAN 10 in operation 41.

The mobile terminal 13 receives desired blog data from the first MB caster 12, and displays the desired blog data in a display of the mobile terminal 13 in operation 42. If a user finds an interesting item (or, downsized data) while checking the blog data shown in the display, the user selects the item.

The data type of the selected item to be received by the mobile terminal is determined in operation 43. In the case where the first MB caster 12 stores original data with respect to the item selected by the user, the first MB caster 12 may directly transmit the original data to the mobile terminal 13 in operation 47.

However, in the case where the user does not desire the original data, or in the case where desired original data is not stored in the first MB caster 12, the mobile terminal 13 receives metadata about the selected item from the first MB caster 12 in operation 44.

If the user, who has obtained the metadata in operation 44, desires to obtain the original data, the user accesses the web blog server 16 in operation 45. When the mobile terminal 13 and the web blog server 16 are connected, the user transmits the metadata (e.g., URL), corresponding to the desired original data, to the web blog server 16 via a network. The web blog server 16 detects the original data by referring to the received metadata, and then transmits the detected original data to the mobile terminal 13. In this manner, the user may download the desired original data in operation 46.

Figure 5:
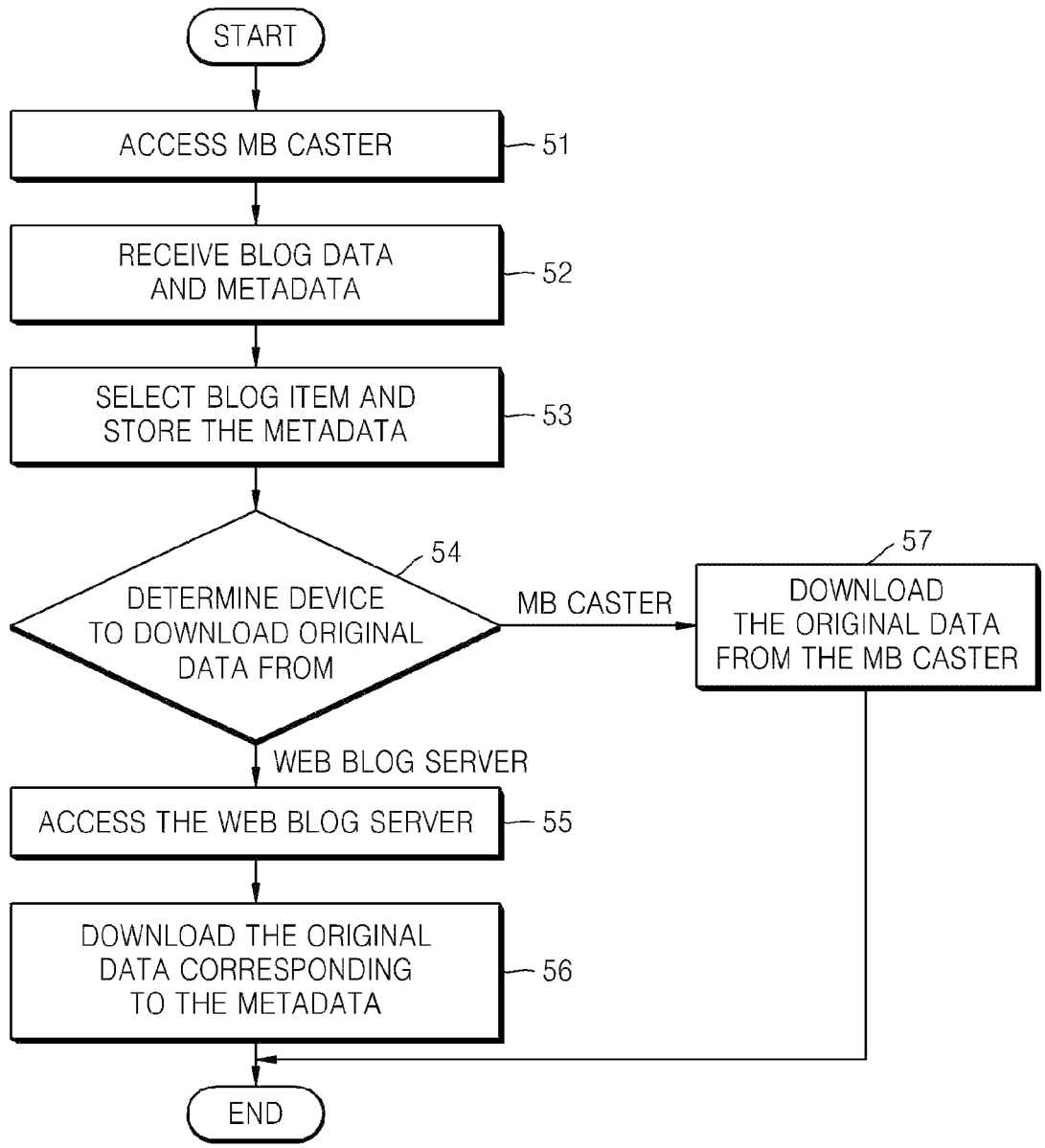
FIG. 5 is a flowchart of a method of providing a blog by using a mobile terminal, according to another embodiment of the present invention.

FIG. 5 is a flowchart of a method of providing a blog by using the mobile terminal 13, according to another embodiment of the present invention. The method of providing the blog in FIG. 4 and the method of providing the blog in FIG. 5 include common operations, and thus, the method of providing the blog in FIG. 5 will now be described by focusing on differences between the method of FIG. 4 and the method of FIG. 5.

When the mobile terminal 13 accesses the first MB caster 12 in operation 51, the first MB caster 12 transmits blog data of the first MB caster 12 with metadata corresponding to the blog data to the mobile terminal 13 in operation 52. Thus, the method of FIG. 5 does not include operation 44 of FIG. 4.

A user of the mobile terminal 13 clicks and selects a specific item (or, downsized data), while checking a blog page displayed in the mobile terminal 13. The selected item and metadata corresponding to the selected item are stored in the storage unit 28 in operation 53. The user may access the web blog server 16, and may download original data by using the metadata in operations 55 and 56.

If the original data is also stored in the first MB caster 12, the user may download the original data from the first MB caster 12. That is, in the case where the user selects the first MB caster 12 as a device to download the original data from in operation 54, the metadata is transmitted to the first MB caster 12. After that, the first MB caster 12 detects the corresponding original data by referring to the received metadata, and transmits the original data to the mobile terminal 13 in operation 57.

The method and system to provide the blog according to aspects of the present invention have the following advantages. Since the blog is created and provided by using the downsized data instead of the original data, a blog server operation can be realized by using existing mobile devices. Furthermore, operations to manage the blog are commonly performed in a mobile terminal, and thus, the mobile terminal does not have to always be connected to the Internet (or, a web blog server) for a blog service. Also, although a wireless PAN having a limited speed of below 100 Mbps is used, it is possible to provide the blog at very high speed.

Aspects of the present invention can also be embodied as computer-readable codes on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mobile blog (MB) caster residing on a mobile device to provide blog data, the MB caster comprising:
    a data downsizer to downsize original data, wherein the original data includes image data and audio data, prior to creating and/or editing a blog;
    a metadata generation device to generate metadata corresponding to the original data;
    a blog editor to create and/or to edit the blog by using the downsized original data; and
    a memory to store the downsized original data, the blog created by the blog editor, and the generated metadata; and
    a network interface to upload the original data to a web blog server, wherein the web blog server is physically separate from the MB caster,
    wherein the data downsizer downsizes the image data by at least one of compressing or reducing a resolution of the image data and downsizes the audio data by compressing the audio data, and
    wherein the network interface provides the generated metadata and the blog created by using the downsized original data to another mobile device in response to the another mobile device accessing the MB caster for the blog to be displayed on the another mobile device.

2. The MB caster as claimed in claim 1, wherein the metadata comprises a storage location of the original data, an identification, a production time, a production place, a producer, and/or a data summary.

3. The MB caster as claimed in claim 1, wherein the network interface performs data communication with the web blog server.

4. The MB caster as claimed in claim 1, further comprising a personal area network (PAN) interface to process a data communication with another mobile terminal forming a PAN.

5. The MB caster as claimed in claim 4, wherein the PAN interface uses WiBro (Wireless Broadband), wireless USB (universal serial bus), Bluetooth, UWB (Ultra-wideband), and/or Zigbee as a communication protocol.

6. The MB caster as claimed in claim 1, further comprising an original data collector to collect the original data.

7. The MB caster as claimed in claim 6, wherein the original data collector comprises an image capture unit, a recording unit, and/or a sensor unit.

8. The MB caster as claimed in claim 1, wherein the network interface uploads the original data to the web blog server via a relay device.

9. The MB caster as claimed in claim 7, wherein the sensor unit comprises a Global Positioning System (GPS), an acceleration measurement sensor, a pulse measurement sensor, and/or a temperature sensor.

10. The MB caster as claimed in claim 1, wherein the blog editor creates and/or edits the blog while the MB caster is not connected to the Internet and the web blog server.

11. A method of creating and editing a blog by using a mobile blog (MB) caster residing on a mobile device, the method comprising:
    generating metadata corresponding to original data, wherein the original data includes image data and audio data;
    creating and editing blog data from downsized original data obtained by downsizing the image data and audio data before the creating and editing the blog data;
    storing the downsized original data, blog data created by a blog editor, and the generated metadata;
    uploading the original data from the MB caster to a web blog server, wherein the web blog server is physically separate from the MB caster; and
    transmitting the generated metadata and the blog created by using the downsized original data to another mobile device in response to the another mobile device accessing the MB caster for the blog to be displayed on the another mobile device,
    wherein the downsizing the image data comprises at least one of compressing or reducing a resolution of the image data and downsizing the audio data comprises compressing the audio data.

12. The method as claimed in claim 11, further comprising collecting the original data in the MB caster.

13. The method as claimed in claim 11, wherein the uploading of the original data comprises: transmitting the original data from the MB caster to a relay device; and retransmitting the original data from the relay device to the web blog server.

14. The method as claimed in claim 11, wherein the metadata comprises a storage location of the original data, an identification, a production time, a production place, a producer, and/or a data summary.

15. A non-transitory computer-readable recording medium encoded with the method of claim 11 and implemented by a computer.

16. A mobile blog (MB) caster residing on a mobile device to provide blog data, the MB caster comprising:
    a data downsizer to downsize original data, wherein the original data includes image data and audio data, that is collected or stored by the MB caster;
    a metadata generation device to generate metadata corresponding to the original data that is collected or stored by the MB caster;
    a network interface to transmit metadata corresponding to original data to a web blog server physically separated from the MB caster and to upload the original data to the web blog server;
    a blog editor to create and/or to edit a blog by using the downsized original data; and
    a memory to store the downsized original data, the blog created by the blog editor, and the generated metadata,
    wherein the data downsizer downsizes the image data by at least one of compressing or reducing a resolution of the image data, and downsizes the audio data by compressing the audio data, and
    wherein the network interface provides the generated metadata and the blog created by using the downsized original data to another mobile device in response to the another mobile device accessing the MB caster for the blog to be displayed on the another mobile device.

17. A method of creating and editing a blog by using a mobile blog (MB) caster residing on a mobile device, the method comprising:

generating metadata corresponding to original data, wherein the original data includes image data and audio data;

transmitting metadata corresponding to original data to a web blog server physically separated from the MB caster;

creating and editing blog data from downsized original data obtained by downsizing the image and audio data before creating and editing the blog data;

storing the image data and/or audio data, created and edited blog data, and generated metadata;

uploading the original data to the web blog server; and transmitting the generated metadata and the blog created by using the downsized original data to another mobile device in response to the another mobile device accessing the MB caster for the blog to be displayed on the another mobile device, wherein the downsizing of the image data comprises at least one of compressing or reducing a resolution of the image data and downsizing of the audio data comprises compressing the audio data.

* * * * *

UNITED STATES PATENT AND TRADEMARK OFFICE
CERTIFICATE OF CORRECTION

PATENT NO. : 8,260,965 B2  Page 1 of 1
APPLICATION NO. : 12/259408
DATED : September 4, 2012
INVENTOR(S) : Seung-woo Shin et al.

It is certified that error appears in the above-identified patent and that said Letters Patent is hereby corrected as shown below:

In the Claims:

Column 8, Line 12, In Claim 11, delete "the creating" and insert -- creating --, therefor.

Signed and Sealed this
Fourteenth Day of May, 2013

Teresa Stanek Rea
*Acting Director of the United States Patent and Trademark Office*